J. R. ST. JOHN.
Making Soap.
No. 9,008. Patented June 8, 1852.
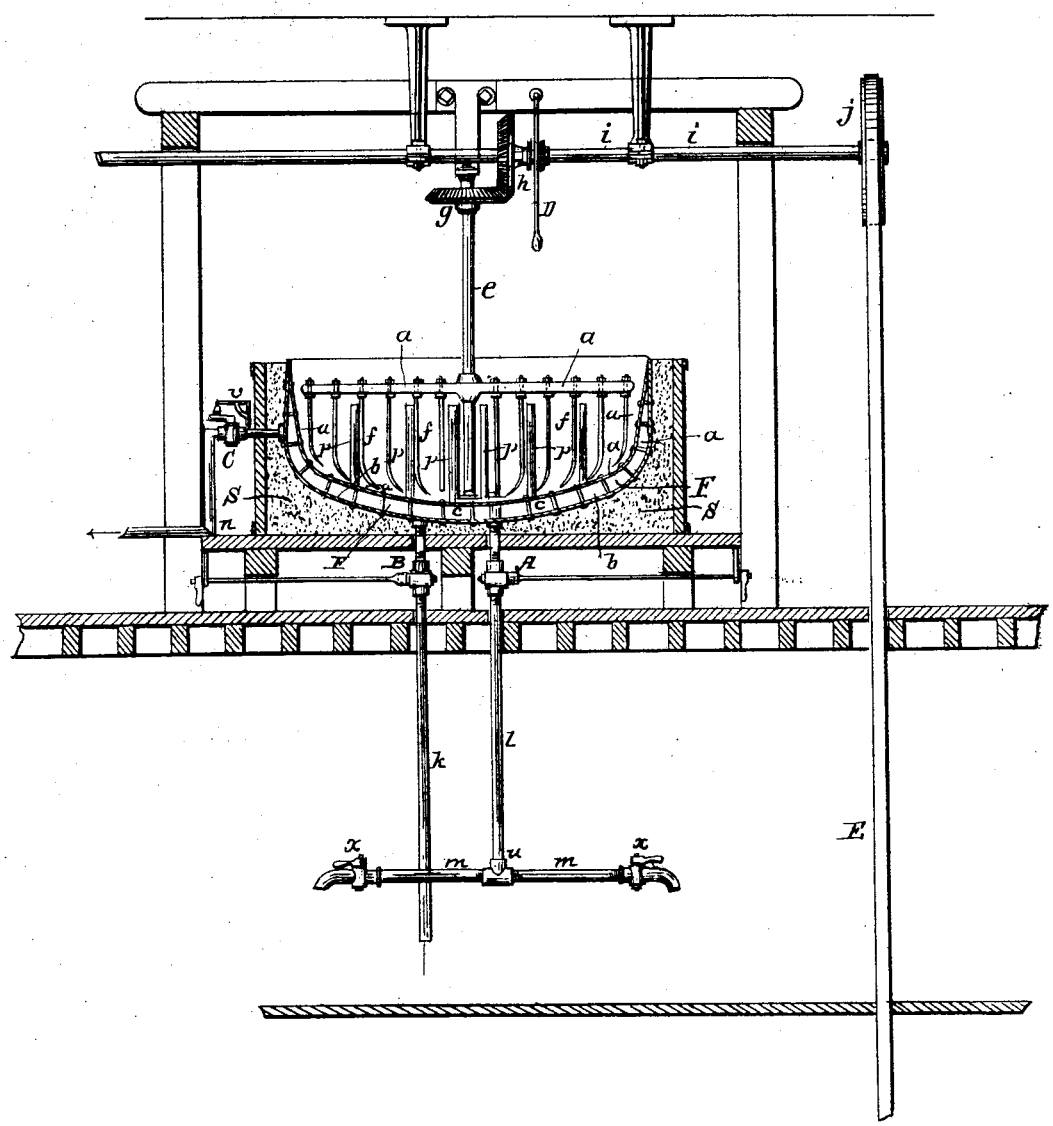

UNITED STATES PATENT OFFICE.

JOHN R. ST. JOHN, OF NEW YORK, N. Y.

IMPROVEMENT IN THE CONSTRUCTION OF SOAP-BOILERS.

Specification forming part of Letters Patent No. 9,008, dated June 8, 1852.

*To all whom it may concern:*

Be it known that I, JOHN R. ST. JOHN, of the city, county, and State of New York, have invented a new and useful Apparatus for Heating, Boiling, and Mixing by Steam, denominated "St. John's improved steam-heating, boiling, and mixing apparatus," which is described as follows, reference being had to the annexed drawing of the same, making part of this specification.

The apparatus which I employ for mixing and stirring ingredients to be heated or boiled by steam or other heat is shown in the accompanying drawing, in which the figure represents a longitudinal vertical section of the apparatus.

It will be seen that the kettle or vessel $a\,a$, which contains the ingredients to be treated, has an outside casing or jacket $b\,b$, made steam-tight, and the heat for boiling the materials is obtained from steam, which is admitted into the space $c\,c$ between the vessel $a\,a$ and jacket $b\,b$ by a pipe $k$, which communicates with a steam-generator of any of the usual constructions. The steam can be let off from the steam-space $c\,c$, when required, by means of the pipe $n$, which is furnished with a stop-cock $C$ for the purpose. This pipe $n$ is also provided with safety-valve $v$.

The stirring operation is effected by a revolving horizontal arm $d\,d$, mounted upon a perpendicular shaft $e$ in the mixing-kettle. This arm $d$ is furnished with rods or stirrers $f\,f\,f\,f$, which reach to near the bottom of the kettle.

The stirring apparatus is actuated by gearing in connection with bands and pulleys.

In the drawing, a bevel wheel $g$ is mounted horizontally on the vertical shaft $e$ and gears into a similar wheel $h$ on the horizontal shaft $i$, on the other end of which is mounted a pulley $j$, which is driven by a band or strap $E$, in connection with any convenient motive agent. When the admixture of the materials has been effected and the process is completed, the ingredients are run off, as before stated, out of the vessel $a$ by means of the pipe $l$, which is furnished with cocks and with branch pipes $m\,m$ leading to the receivers.

$p\,p\,p\,p\,p\,p$ are vertical tubes fixed to the bottom of the kettle, open at the lower ends to admit steam into them from the steam-chamber $c$ and closed at the upper ends to prevent escape, said fixed steam-pipes serving to diffuse heat throughout the entire mass in the kettle, as well as for stops to arrest and break up the mass as it is carried round by the stirrers $f\,f$.

It is scarcely necessary to say that any number of these boiling and mixing apparatus may be employed side by side when large quantities of ingredients are required to be operated upon, and I would observe that if thought advisable the boiling-vessel may be furnished with a cover, due provision being of course made for the convenient introduction of the materials from time to time to the vessel. The outside of the jacket must be set in a good non-conducting material $s$ to prevent the escape of heat.

$u$ is a T or swivel joint, so constructed that the arms $m\,m$ may be turned horizontally in a circle, in order to bring the cocks $x\,x$ over a circular range of receivers.

A is a cock for letting the charge into the branches $m\,m$.

B is a stop-cock for admitting the steam to the space $c$ and pipes $p$ and for shutting it off.

C is a stop-cock for opening or closing the escape-pipe for regulating the degree of heat.

D is a clutch-lever for throwing the cog-wheel $h$ into and out of gear with the cog-wheel $g$ when it is desired to start or stop the motion of the stirrers.

E is a band leading from the driving-power to the pulley $j$ on the shaft $i$.

F are stay-bolts for connecting the kettle to the jacket.

Having thus described the construction and operation of my apparatus for heating, boiling, and mixing by steam, I desire it to be understood that I do not claim to be the original inventor of the application of steam to heating, boiling, and mixing; but

What I do claim as my invention, and desire to secure by Letters Patent, is—

The combination of the steam-jacket $c\,c$, tubes $p\,p$, and agitating-rods $f\,f$, for transmitting and equally diffusing heat through soaps and other similar substances where it is difficult to keep up a uniform heat throughout the mass, substantially in the manner set forth and shown.

In testimony whereof I have hereunto signed my name before two subscribing witnesses.

JNO. R. ST. JOHN.

Witnesses:
 WM. P. ELLIOT,
 J. S. SMITH.